United States Patent Office 2,911,185
Patented Nov. 3, 1959

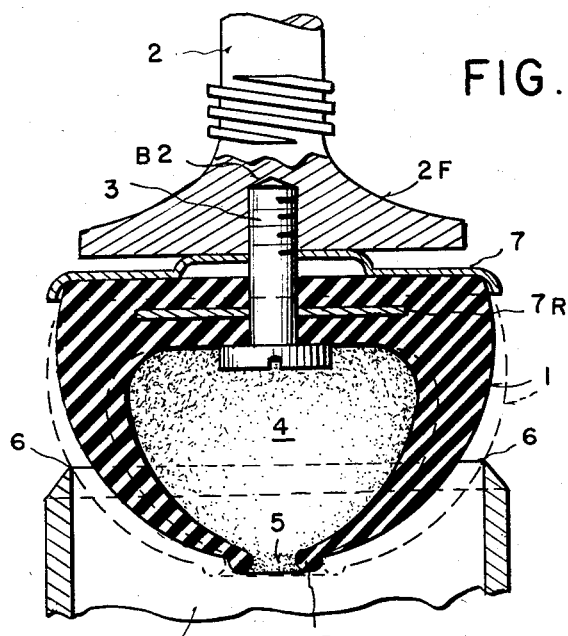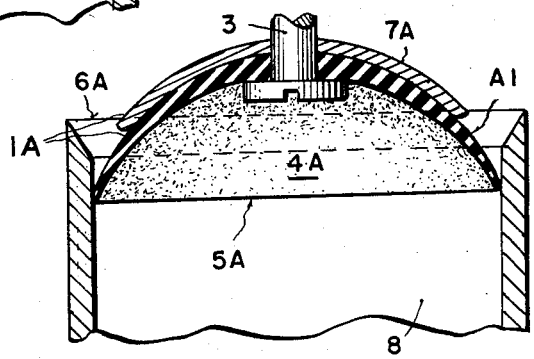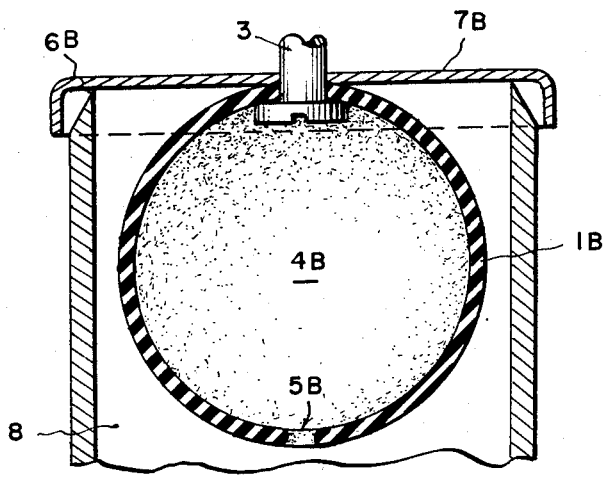

2,911,185
INFLATABLE VALVE MEMBER
Jesse D. Langdon, Long Beach, Calif.
Application March 2, 1954, Serial No. 413,507
6 Claims. (Cl. 251—175)

This invention pertains to valve members adapted to control the passage of pressure fluid thru a tubular conduit.

The primary purpose of this invention is to provide a hollow inflatable valve member for interrupting the flow of pressure fluid thru a tubular conduit, the valve member adapted to be expanded by fluid pressure from within the conduit according to the proximity of the valve member to an annular seat formed by the outer terminus of the surrounding tubular wall of the conduit and providing a single valve member capable of being expanded due to the effects of a velocity head of fluid entering the hollow valve member prior to seating to close passages of various diameters.

Another object is to provide an inflatable hollow valve member registering with the inlet opening of a fluid pressure control valve, the valve member adapted to be seated against the surrounding wall of the inlet passage of the control valve by manual adjustment and fluid pressure entering into a hollow chamber provided for the valve member.

A still further object is to provide an inflatable control valve provided with a reinforcing cap closing the outer terminal end of and suspending the valve within a fluid pressure pipe line said valve adapted to be expanded by internal pressure entering thru an orifice communicating with a chamber in the valve member and the pressure side of the pipe line.

Other and further objects and purposes will appear during the progress of the specification as illustrated by the drawings which are purely diagrammatic and used only for the purpose of illustrating three species of reduction to practice which may be changed within the scope of the claims:

Of the drawing:

Fig 1 is an elevation in median section showing one species of combination with essential portions of a control valve mechanism particularly adaptable to bib or faucet washers.

Fig. 2 is a median section of a second species of the invention showing a valve member adapted to seat entirely within the inlet passage of a valve or fluid pressure pipe line.

Fig. 3 is a median section showing a third species of the invention having the capacity of double seating against both the end and the internal wall of a valve inlet.

The preferred species of the invention consists of the reduction to practice shown by generic Fig. 1. This form of valve member is adapted for use with a controlled valve body or casing having an inlet 8 and an outlet not shown, a hollow valve member 1 made of rubber-like material secured to a valve stem 2 having a bottom tapped bore B2 with valve attaching means inserted therein and formed by set-screw 3 or other suitable pin or pivot means securing the member 1 in operative position, reinforcing means 7 made of relatively hard material capping and disposed transversely of that portion of said member 1 proximate the flare 2F of stem 2; the reinforcement means adapted to prevent reversal of the member 1 due to the effects of internal pressure within the inlet 8 at such times as during the seating interim of the valve member 1 against the seat 6, said member 1 disposed in a position registering with the inlet passage 8 provided for the passage of pressure fluid. The chamber 4 having a by-pass or opening 5 communicating with the inlet passage 8 and surrounded by reinforcing bead B to maintain the size of bypass 5. The wall surrounding passage 8 terminates in a sharp seat 6 adapted to be contacted by at least a portion of the outer wall of valve member 1, same being actuated manually via stem 2 or by the effect of internal pressure entering chamber 4 thru bypass 5, the reinforcing means 7 or 7R, one or both can be used, being of an extent together with a thickened portion of the rubber-like member 1 to prevent that portion of member 1 proximate the flared portion of stem 2F from being urged beyond the confines of said seat 6 by internal pressure.

The reduction to practice as of Fig. 2 shows member 1A to be bell-shaped as shown by my application Ser. No. 114,418, filed Sept. 7, 1949, No. 2,675,825 granted April 20, 1954 wherein the bell-shaped member 4 forms a check-valve. Any of the instant application adaptations of the bell-shaped member, 1 of Fig. 1, 1A of Fig. 2, or 1B of Fig. 3 may be adapted for use as a valve member or pipe line closure element, all species shown belong to the same generic category as instant Fig. 1 all showing reinforcement equivalent to 7 or 7R.

In operation the several species of inflatable valve member are shown to be capable of being inflated and expanded by fluid exerting internal pressure passing either into chamber 4 via bypass 5, chamber 4A via open end 5A or chamber 4B via bypass or opening 5B as of Figs. 1, 2, and 3 respectively, causes deformation of the wall of any form of member shown to be within the confines of reinforcement 7, 7A or 7B to expand against the surrounding seat 6 or the wall of passage 8 as the case may be. The extent of wall A1 of the flexible member 1A below the rim of the reinforcement 7A can be varied, as can the diameter of reinforcement 7A according to the pressure conditions to which the inflatable member is to be adapted. It must be borne in mind that any form of reinforcement must be of sufficient diameter to prevent the rubber-like wall of the inflatable member from bypassing between the outer periphery of the reinforcement and any seat formed by the wall of the passage 8.

The reduction to practice as of Fig. 3 shows a globe-shaped hollow inflatable member 1B with a relatively small bypass formed by the opening 5B.

By making bypass opening 5B small enough, delayed expansion of the member 1B can be achieved, as is also the case when using the forms of valve member 1 of Fig. 1 or 1B of Fig. 3.

The member 1B of Fig. 3 can be arranged to be entirely withdrawn from inlet 8 to open same; or if desired, to cut down the liquid flow and consequently the pressure in a valve or pipe line beyond reinforcement 7B, the member 1B may be set to remain in passage 8 and will be expanded or contracted according to the space existing between the reinforcement 7B and the proximate end of the wall of passage 8. Thus it will be seen that among other things, the instant invention may be used for pressure adjustment by interrupting the expansable member between the inlet and outlet ends of a pressure fluid pipe line.

In order to control the pressure fluid volume passing thru a pipe line, it is advised that the species of valve member preferred for this purpose should be one of the forms shown as 1 of Fig. 1 and 1B of Fig. 3.

It is anticipated that the form shown by Figs. 1 and 3 in particular may be suspended in a pipe line by a spider or partition having bypass openings therethru, thereby providing an automatic pressure adjusting valve for interrupting pressure fluid passage thru a pipe line. In making use of the invention as a pressure adjusting valve the bypass 5 of Fig. 1 or 5B of Fig. 3 communicating with chambers 4 or 4B should be of suitable diameter according to the size of a valve or outlet opening beyond the inflatable valve member.

The reinforcement bead B may be applied around the openings 5, 5A or 5B Figs. 1, 2 and 3 respectively to restrict the expansion of the valve member opening facing the inlet end or side of the pipe line.

Having described the invention and the operation thereof, the following claims are made:

1. A combination including an inflatable valve member insertable into and adapted to seat against an annular seat formed by the outer terminal end of a pressure fluid inflow supply conduit, the valve member comprising a hollow body provided with a substantially thin wall made of deformable material capable of bulging under internal pressure and returning to shape, a chamber formed by the hollow of said valve member having one end provided with an unimpeded opening facing toward the inflow conduit passage said valve member being provided with reinforcement means standing substantially transversely of a portion of the valve wall that is exposed outwardly of the inflow conduit and forming a rigid area backing that portion of the valve wall that is opposite the inflow side, said reinforcement means securing the valve together with adjustable manual operating means holding said valve member juxtapositioned and registering with the terminal end of said annular valve seat; said valve member being secured to an actuating stem for imparting reciprocal movement for said valve from without to within said annular seat, said valve resting in open position clearing the proximate end of said inflow conduit forming said annular seat, said unimpeded opening communicating between the chamber of said valve and the conduit passage, the valve hollow exposed to the effects of a velocity head of pressure fluid emanating from said conduit effective directly against and internally of the deformable wall of said valve, whereby fluid pressure contained within said conduit prevails within the hollow of said valve in accordance with the proximity of and prior to the seating of said valve against said annular seat, thereby urging the wall of said hollow body to seat against said annular seat, the valve diameter being changed concomitant the fluid pressure and flow volume via said conduit.

2. A device as defined by claim 1 wherein the inflatable valve member is globular in form and provided with a restricted opening forming a bypass communicating between the hollow of the valve and the inflow side of the conduit passageway, said passage being reinforced to resist enlargement by incoming fluid pressure entering the chamber of the valve member.

3. A valve device as defined by claim 1; wherein the valve member is globular in form, a relatively small unimpeded opening facing the inflow conduit is restricted, an unsupported wall portion of said valve member made of deformable elastic material, said valve member adapted to seat against the proximate end of the conduit passage, said valve member being free to expand and seat against the inner wall portion of the conduit in accordance with pressure confined within said conduit and the hollow of said valve member.

4. A valve device as defined by claim 1, wherein the valve member is provided with a seating portion proximate the inside conduit passage wall and constituting the boundary of the unimpeded opening exposed to the effects of pressure fluid inflow, thru said conduit passage, said seating portion being formed by the outer peripheral edge of the hollow valve member.

5. An inflatable valve of the nature defined by claim 1; wherein the hollow inflatable valve member includes a substantially globular body made of deformable material having an unobstructed end opening formed by a relatively small bypass facing the inflow end of the conduit passage and communicating between the passage of said conduit and the valve hollow, said bypass providing constant communication with an inflow stream of pressure fluid emanating from said conduit, whereby when the valve is moved to closed position, pressure fluid entering the hollow through said bypass will urge the wall of the globular body radially outward and toward a valve seat formed by the inner annular wall of the inlet passage, said valve member being provided a rigid reinforcement on that side that is opposite said bypass to hold the valve member in closed position.

6. A combination including an inflatable valve member insertable into and adapted to seat against an annular seat formed by the outer terminal end of a pressure fluid inflow supply conduit, the valve member comprising a hollow body provided with a substantially thin wall made of deformable material capable of bulging under internal pressure and returning to shape, a chamber formed by the hollow of said valve member having one end provided with an unimpeded opening facing toward the inflow conduit passage said valve member being provided with reinforcement means standing substantially transversely of a portion of the valve wall that is exposed outwardly of the inflow conduit and forming a rigid area backing that portion of the valve wall that is opposite the inflow side, said reinforcement means securing the valve together with adjustable manual operating means holding said valve member juxtapositioned and registering with the terminal end of said annular valve seat; said inflatable valve member being globular in form, said unimpeded opening forming a relatively small bypass communicating between the hollow of the valve and the inflow side of the conduit passageway, said unimpeded opening being reinforced to resist enlargement by incoming fluid pressure entering the chamber of the valve member.

References Cited in the file of this patent

UNITED STATES PATENTS

| | | |
|---|---|---|
| 1,506,418 | Evensta | Aug. 26, 1924 |
| 1,606,206 | Boynton | Nov. 9, 1926 |
| 2,059,687 | Gagg | Nov. 3, 1936 |
| 2,081,132 | Barnes | May 25, 1937 |
| 2,088,666 | Portl | Aug. 3, 1937 |
| 2,202,123 | Strode | May 28, 1940 |
| 2,282,987 | Bennett | May 12, 1942 |
| 2,284,051 | Gilbert | May 26, 1942 |
| 2,329,960 | Verheul | Sept. 21, 1943 |
| 2,523,864 | Delaney | Sept. 26, 1950 |
| 2,536,431 | Endsley | Jan. 2, 1951 |
| 2,727,471 | Martin | Dec. 20, 1955 |

FOREIGN PATENTS

| | | |
|---|---|---|
| 11,694 | Great Britain | Apr. 18, 1896 |
| 12,334 | Great Britain | June 22, 1895 |
| 184,911 | Great Britain | Aug. 31, 1922 |